United States Patent
Zavesky et al.

(10) Patent No.: US 12,316,638 B2
(45) Date of Patent: May 27, 2025

(54) ENROLLMENT AND SHARING OF DEVICES AND NETWORK-BASED SERVICES VIA ON-PREMISES NETWORK ACCESS POINT

(71) Applicant: AT&T Intellectual Property I, L.P., Atlanta, GA (US)

(72) Inventors: Eric Zavesky, Austin, TX (US); Mun May Tee, San Francisco, CA (US); James Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 403 days.

(21) Appl. No.: 17/970,786

(22) Filed: Oct. 21, 2022

(65) Prior Publication Data
US 2024/0137364 A1  Apr. 25, 2024
US 2024/0236096 A9  Jul. 11, 2024

(51) Int. Cl.
*H04L 9/40* (2022.01)
*H04L 67/306* (2022.01)

(52) U.S. Cl.
CPC .......... *H04L 63/101* (2013.01); *H04L 63/102* (2013.01); *H04L 67/306* (2013.01)

(58) Field of Classification Search
CPC ... H04L 63/101; H04L 63/102; H04L 67/306; G06Q 20/3224; G06F 21/62; G06F 21/1013; G06F 2221/2111
See application file for complete search history.

(56) References Cited

U.S. PATENT DOCUMENTS

| | | | |
|---|---|---|---|
| 9,158,897 B2 | 10/2015 | Spiegler et al. | |
| 9,509,703 B1 | 11/2016 | Martin et al. | |
| 2009/0307759 A1 | 12/2009 | Schnell et al. | |
| 2019/0310820 A1* | 10/2019 | Bates | G06F 9/44505 |
| 2021/0144150 A1* | 5/2021 | James | H04W 12/08 |

OTHER PUBLICATIONS

European Commission, "Regulation of the European Parliament and of the Council on ensuring the cross-border portability of online content services in the internal market", Brussels, 2015, 18 pages.
GOV.UK, "Cross-border portability of online content services", Jan. 30, 2021, accessed from https://www.gov.uk/guidance/cross-border-portability-of-online-content-services, 2 pages.

(Continued)

*Primary Examiner* — Paul E Callahan

(57) ABSTRACT

A processing system may detect at least one endpoint device of at least one user at a premises having a first plurality of functions, may obtain at least one user profile that indicates a second plurality of functions associated with the at least one user, each function having a maximum available function level, and may obtain a visitor profile associated with the premises defining permitted function levels for one or more functions from among the first plurality that the at least one user is permitted to access. The processing system may then select a set of shared functions and function levels for the set based on the at least one user profile and the visitor profile, the set of shared functions including a first function of the first plurality and a second function of the second plurality, and may activate the set at the premises with the function levels.

20 Claims, 6 Drawing Sheets

(56) References Cited

OTHER PUBLICATIONS

Verizon, "FIOS TV Customers Can Now Watch TV Shows and Movies on Mobile Devices While Away From Home", Apr. 20, 2013, accessed from https://www.verizon.com/about/news/fios-tv-customers-can-now-watch-tv-shows-and-movies-mobile-devices-while-away-home, 5 pages.

Xfinity, "Watch TV Anywhere, Anytime", accessed from https://www.xfinity.com/hub/tv-video/watch-tv-anywhere on Jan. 5, 2023, 6 pages.

* cited by examiner

FIG. 2

USER PROFILE 210

| FUNCTION/AMENITY | LEVELS | MAX PERMITTED LEVEL TRAVELING | MAX PERMITTED LEVEL TRAVELING WITH OTHERS |
|---|---|---|---|
| STREAMING SERVICE 1 | 720p, 1080p, 4K | 4K | 720p |
| STREAMING SERVICE 2 | 720p, 1080p, 4K | 1080p | N/A |
| GAMING SERVICE 1 | REGULAR, PREMIUM | REGULAR | N/A |
| TABLET COMPUTER | 1 Gb/s, 1080p | SAME | SAME |
| DIGITAL ASSISTANT 1 | ALL COMMANDS, INFORMATION ONLY | INFORMATION ONLY | INFORMATION ONLY |

VISITOR PROFILE 220

| FUNCTION/AMENITY | LEVELS | MAX PERMITTED LEVEL - VISITOR(S) | AUTO-GRANT INCREASE |
|---|---|---|---|
| TV1 | 720p, 1080p, 4K | 4K | N/A |
| INTERNET | 1 Gb/s, 500 Mb/s, 50 Mb/s | 50 Mb/s | Y |
| CABLE | [720p, 1080p, 4K], [BASIC, DELUXE, PREMIUM] | 720p/BASIC | N |
| OUTDOOR SPEAKERS | [0 TO 100 W], [ALL HOURS, DAYTIME ONLY] | 10 W/DAYTIME ONLY | N |
| TV2 | 1080p, 4K, 8K | 8K | N/A |

200

ND SHARING OF DEVICES
AND NETWORK-BASED SERVICES VIA
ON-PREMISES NETWORK ACCESS POINT

The present disclosure relates generally to smart homes or other premises and more particularly to methods, computer-readable media, and apparatuses for selecting and activating a set of shared functions with a set of function levels at a premises based on at least one user profile and a visitor profile.

BRIEF DESCRIPTION OF THE DRAWINGS

The teachings of the present disclosure can be readily understood by considering the following detailed description in conjunction with the accompanying drawings, in which:

FIG. 2 illustrates an example user profile and an example visitor profile, in accordance with the present disclosure;

To facilitate understanding, identical reference numerals have been used, where possible, to designate identical elements that are common to the figures.

DETAILED DESCRIPTION

Figure 1:
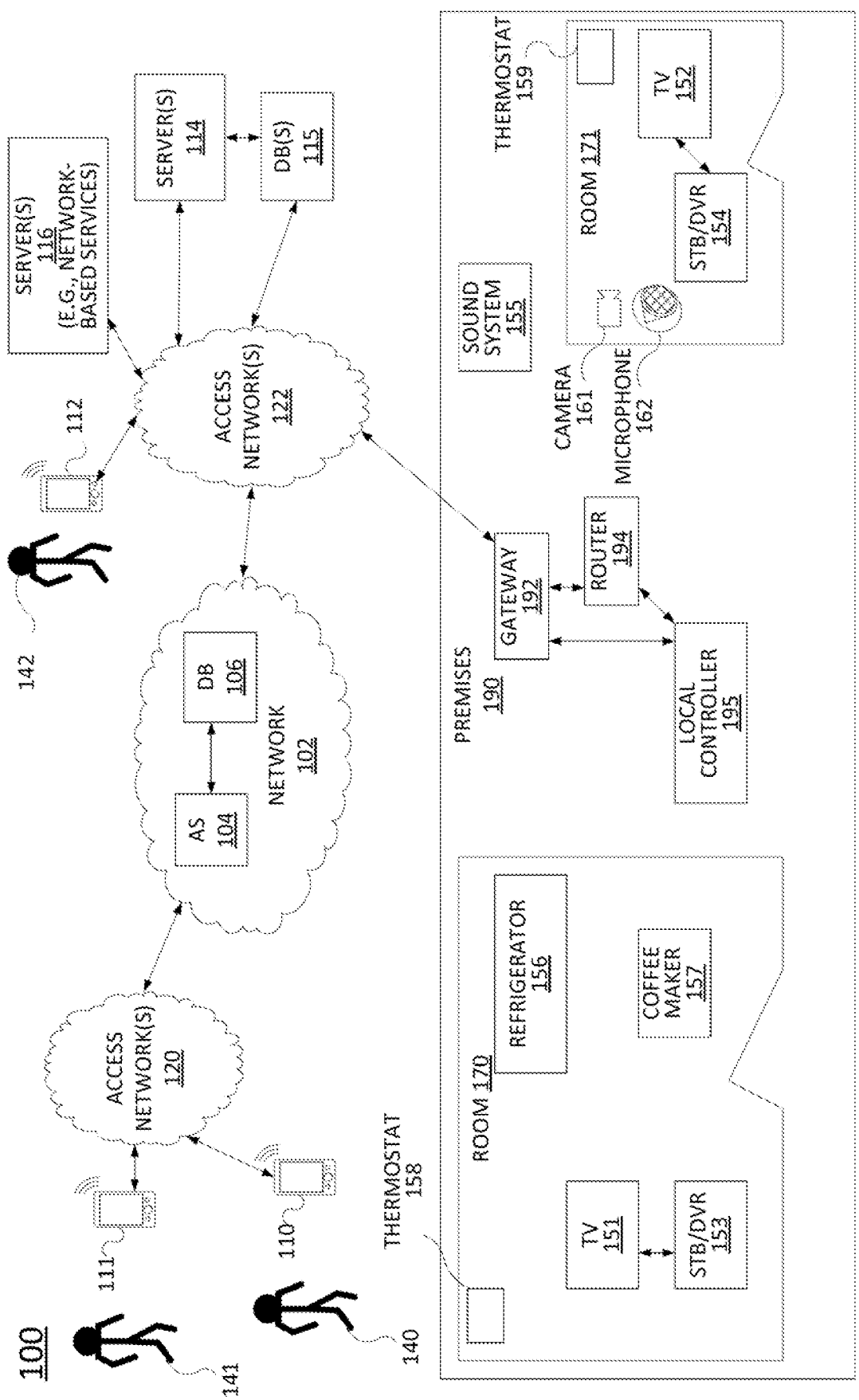
FIG. 1 illustrates an example system comprising one or more communication networks related to the present disclosure.

In one example, the present disclosure describes a method, non-transitory computer-readable medium, and apparatus for selecting and activating a set of shared functions with a set of function levels at a premises based on at least one user profile and a visitor profile. For instance, a processing system including at least one processor may detect a presence of at least one endpoint device associated with at least one user as an authorized visitor to a premises, where a first plurality of functions is available for use by the at least one user at the premises, and may obtain at least one user profile of the at least one user, where the at least one user profile indicates at least a second plurality of functions associated with the at least one user, where each function of the first plurality of functions and of the second plurality of functions has a maximum available function level. The processing system may also obtain a visitor profile associated with the premises, the visitor profile defining permitted function levels for one or more functions from among the first plurality of functions that the at least one user is permitted to access. The processing system may next select a set of shared functions at the premises based on the at least one user profile and the visitor profile, the set of shared functions including at least a first function of the first plurality of functions and at least a second function of the second plurality of functions, and may select a set of function levels for the set of shared functions at the premises in accordance with the at least one user profile and the visitor profile. The processing system may then activate the set of shared functions at the premises for the at least one user in accordance with the set of function levels.

For instance, families often vacation together. In addition, users may share a co-working space. Examples of the present disclosure enable two or more users and/or accounts to join in the same experience, and to temporarily connect and share content or functionality in a new and/shared premises, such as a vacation home, a co-working space, and so forth. In addition, examples of the present disclosure bridge functionality from the premises to the user(s) network-based experiences. To illustrate, a local controller (e.g., a processing system) deployed at a premises may enable content sharing that is time- or geo-bounded to define which content is shareable, at which quality level(s), and so forth. In one example, this may include bridging services from "visiting" users into a new home or other premises (e.g., accounts logged into via an on-premises media system). In one example, the present disclosure may transfer user profiles and automation (e.g., digital assistant services) to a visited premises and the devices and network-based services available therein. In one example, the local controller effectively emulates an owner account with limitations for new guests/visitors, including locational, time, and functional restrictions (e.g., geofences, time limitations, etc.). In one example, relatives or other trusted guests may use services on an owner's behalf while visiting in accordance with a visitor profile.

To further illustrate, in one example, accounts and services from each individual, family, or the like can be pooled and vetted for sharing and use throughout the premises (e.g., a shared environment). In one example, user profiles may be stored in a network-based processing system (e.g., one or more servers) and obtained by/provided to a local controller at a premises. The user profiles may allow different functionality levels for functions/capabilities (e.g., devices or network-based services). Effectively, updating the user profile(s) may turn features on/off (and/or change the function level) in a centralized way. The local controller may serve as a mediator/policy and enforcement point for capability/function interactions. For example, when visiting a premises a user may reach a limitation within the shared system(s) (either from the digital partitioning of services or from policy enforcements, e.g., in accordance with a user profile and/or a visitor profile maintained at the local controller and/or at a network-based system for premises functionality sharing management). In one example, the limitation(s) may be triggered by an event or may be discovered when the user device(s) initially attach to the local network at a premises (or in advance). In one example, the local controller and/or application on the user device(s) may permit the user, or users, to request upgrade of one or more function levels from an entity responsible for the premises and/or from one or more network-based services, e.g., a video streaming service, a gaming service, or the like. In one example, a user profile and/or visitor profile may be updated to reflect the changes permitted and/or available function levels for one or more services that are upgraded.

Thus, examples of the present disclosure enable physical enrollment of users' network services at new facilities or locations. In addition, examples of the present disclosure enable combining of network services of shared spaces among multiple individuals at the same new location (e.g., three friends rent an office space for the day and commingle their network services across the users' devices and/or devices available at the office space). Similarly, examples of the present disclosure may mix user-provided functions and local entitlements for preference and permission matching (which may be limited by location capabilities or combined user account entitlements). For instance, one or more guest users may be entitled to access a cable television subscription of a premises, but the function level may be less than a maximum available function level (e.g., a top tier of service, and/or a tier of service that the premises owner has subscribed to for their own use at home). In other words, the guests may be assigned a lesser function level (such as the ability to access basic cable television channel programming only without the ability to access premium cable television channel programming) either at the discretion of the premises owner, other responsible entities and/or per subscription agreement with the cable television service provider.

In an illustrative example, a premises and the available devices and network-based services thereof may be enrolled for management, e.g., via a network-based system for premises functionality sharing management. For instance, an owner may define limitations/policies, e.g., in one or more visitor profiles, which may be maintained by either or both of the network-based system for premises functionality sharing management or the local controller at the premises. When an authorized visitor reaches the premises, a mobile phone or similar device of the visitor may be detected, triggering automated enrollment of various functions of the visitor and the premises. In one example, a creation of a new content space may also be triggered (e.g., for new photos, captured songs or other audio playlists that are created, etc.) with temporary binding to the visited premises. In one example, assets locally created are either deleted or archived for the visitor's future use. For instance, in one example, temporary content creation via premises supplied devices may be shared with user devices during and/or after a visit. In another example, those assets may be passed to a secondary service provided by the owner on behalf of the visitor. Continuing the example above, photos and videos temporarily stored vis the premises may be provided to auto-captioning and video creation software for the creation of a photobook or highlight reel on behalf of the visitor as an included or extra-tier service.

In one example, the local controller may obtain a user profile of the visitor and may import certain profiles or settings. The visitor profile may also indicate to the local controller the functions/capabilities of the premises to make available to the visitor, and at which function levels. In one example, capabilities/functions and function levels may be conveyed to the visitor in connection with the enrollment. This may include functions made available by the premises, as well as the functions that the visitor may bring to the premises (i.e., the visitor is usually entitled to such functions at a different location, e.g., at home or at work). In one example, one or more devices of the visitor may be temporarily registered to provide input/control signals to devices and/or services of the premises (e.g., keyboard, keypad, or other touch inputs, voice commands, gestures, biometric inputs, etc.). In one example, temporary authorization and token transfer for visitors to a premises may be coordinated via a mobile device application (app) and detection of the mobile device at the premises. In one example, the application may be integrated with a single sign on (SSO) platform, a two-factor authentication service, and so forth. Examples of the present disclosure thus facilitate the fast multimodal enrollment for guests/visitors to a premises, such as a smart home or other immersive environments.

In one example, the local controller may provide an "introduction" in the form of text, audio, and/or video to inform the visitor of how to interact with various functions within the premises, to know what will or will no work, and so forth. For instance, the introduction may provide both exemplar commands and show where such commands will work or do not work. In one example, the introduction may highlight any changes in functions that the visitor may be accustomed to (e.g., in the visitor's own home, office, etc.). For example, the visitor may have a gigabit speed Internet connection at home, but the visited premises may only provide 200 mb/s speed Internet connection. In another example, the user may have a streaming video service with a 4K subscription level, but the premises may offer the same streaming video service in an 8K subscription level. As such, the local controller may establish connections between the user profile of the visitor and one or more functions of the premises (e.g., a television, a sound system, etc.). Alternatively, or in addition, the local controller may identify potential overlaps in functions, and to select or point out credentials that may provide a highest function level. For instance, the visitor may access a streaming service at the premises in accordance with the user's own subscription for 4K video (e.g., a maximum video quality level based on the user's own subscription). However, it may be beneficial to instead use a subscription to the same service that is associated with the premises that permits access to 8K video.

On the other hand, depending on the visitor profile and the preferences of the premises' owner or another responsible entity, the local controller may limit certain functionalities during enrollment and for the duration of the visitor's presence at the visited premises. In one example, the visitor profile may provide for different limitations in the use of functions based on time of day, the types of devices or other functions that the visitor brings (e.g., the premises' owner may generally permit visitors to utilize a streaming service in accordance with an account associated with the premises; however, when visitors have their own accounts to the same service, the visitor profile may specify that the account associated with the premises may be made unavailable/disabled).

In one example, the local controller may include an application programming interface (API) or the like to interact with certain functions (e.g., a visitor's digital assistant) and to register aspects of the visited location. For instance, the visitor's digital assistant may be provided with well-defined descriptors of the visited premises, such as the available functions, the locations of the available functions, physical features of the visited premises, and so forth. Thus, the digital assistant may differentiate whether "my bedroom" refers to the visited premises or the visitor's own home as an example. For instance, the context may be clear based on the visitor's speech, other inputs, settings of Internet of Things (IoT) devices, etc. As such, the digital assistant may make a determination based on the command "turn off the lights in my bedroom." However, if the context is not clear, the digital assistant may ask "which bedroom, here or at home?"

In one example, if the visitor attempts to use features beyond the scope of authorization (in accordance with the visitor profile and/or the visitor's own user profile), the local controller may provide feedback to the visitor. In one example, feedback may alternatively or additionally be sent as a passive notification to the premises' owner or another responsible entity (e.g., a property management company). In one example, the feedback allows the visitor to request an upgrade of function level(s) for one or more functions. The request may be directed to the premises' owner or another responsible entity, or to a provider of a network-based service, for example. Alternatively, or in addition, the premises' owner or another responsible entity, or the provider of a network-based service may permit the increase in function level. In one example, when authorization is given to increase a function level(s), the visitor profile and/or user profile may be updated accordingly to denote the new entitlement(s). In one example, the local controller and/or the network-based system for premises functionality sharing management may learn when to auto-deny/auto-accept future instances of escalations (e.g., for the same visitor and/or different visitors).

In one example, the local controller and/or the network-based system for premises functionality sharing management may store visitor profiles for one or more users to create a record of authentication and authorization of temporary access to that location's network facilities. For example, if a visitor of a group of the same visitors again rent the same vacation home, initial authentication and authorization of functions (e.g., devices and/or services and the corresponding function levels) may be set in accordance with the stored settings. As such, examples of the present disclosure also provide a scaled e-commerce system associated with upgrading function levels beyond the original entitlements (e.g., increasing a bandwidth associated with an Internet access service, a streaming content service, etc.). In addition, the generalization and abstraction of devices and network-based services as shareable functions provides new and useful combinations of services to be realized.

In addition to the foregoing, examples of the present disclosure enable individual amenity elements or features of a premises to be reserved for use, and for the use to be detected and recorded. Access to the reserved amenities may be electronically enabled once reserved. Additionally, rules of the premises related to the use of the space or amenities within the space may be enforced. For instance, one or more visitor profiles may specify associated rules of use, e.g., the available functions and associated available function levels (e.g., the function levels that are available and/or maximum function levels for one or more functions). In one example, a general visitor profile may apply to all visitors (and/or groups of visitors). In one example, different visitor profiles may be maintained for each visitor. Alternatively, or in addition, a visitor profile may be maintained for a group of visitors (e.g., one for each unique group of visitors).

For instance, a visitor or a group of visitors may select and de-select amenities, or features that may be used during the stay. Features/amenities may include technologies within the premises, such as devices (e.g., televisions, speakers, network-connected appliances, etc.) and network-based services (e.g., cable television service(s), streaming video or other content service(s), gaming service(s), and so forth). Examples of the present disclosure also enable an owner, operator, or manager of the premises to price the use in accordance with amenities that are used and make for more efficient maintenance of the space (e.g., if an amenity is not used, then it may not need to be cleaned after the visitor(s) depart, resulting in the maintenance needs being reduced, etc.).

To illustrate, a user, e.g., a visitor may access a network-based system for premises functionality sharing management via an application on the user's device to view information about properties/premises and their available features/amenities and premises rules. In one example, the network-based system for premises functionality sharing management may include a reservation system to create and store reservations and data about properties for rent in a reservation database. Available features for a property may be included in an inventory for the property in the reservation database. If there is a charge for using a feature (or a discount for not using it), it may be included as well. When a user or a group of users is making a reservation for a premises, the user(s) may be presented with a listing of available features. The user(s) may pre-specify which features are expected to be used during the visit. The features selected may alter the price charged for the rental reservation. The reservation system may send a digital key to the renter's device, such as a smartphone. This key may be used to access the premises, and the available features therein, during the visit (e.g., a predefined rental time period).

It should be noted that when entering the premises, a computing device carried into the premises by the user (or multiple users who are visitors to the premises) may register with the premises, e.g., via a Wi-Fi access point and/or the local controller, or the like. Each such device may be registered and counted as visitor-owned device as a temporary inventory item for the premises for the duration of the stay. Thus, when the user(s) first accesses the premises, the user device(s) may be detected by the local controller. The local controller may query the network-based system for premises functionality sharing management for corresponding user profile(s) that indicate the features that user(s) may import into the premises. In one example, the local controller may already possess one or more visitor profiles of the visitors/users. In another example, the local controller may also obtain from the network-based system for premises functionality sharing management the one or more visitor profiles associated with the premises (and in one example, that is/are specific to the visitor(s)/user(s). In accordance with the visitor profile(s) selected features may be unlocked by the local controller (at associated function levels). In addition, functions imported by the user(s) may be enrolled (e.g., user devices may be associated with the local network and authenticated to one or more network-based services available at the premises; similarly, functions associated with the user(s), such as the user's/users' streaming service(s) may be enrolled via one or more devices of the premises (e.g., on a smart television or the like that is available at the premises).

When the user(s) departs the premises for the last time during the visit, the user may provide an indication of the departure, for example, by using a check-out screen provided by the reservation system via the user's mobile computing device. After checkout (and before cleaning) a usage report may be generated by the reservation system using data collected from the control device(s) and sensors during the period of time of the rental. The usage report may include a listing of features that were reserved but not used, and likewise a listing of features that were used but not reserved during the user's stay. These and other aspects of the present disclosure are described in greater detail below in connection with the examples of FIGS. 1-6.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102 (e.g., a telecommunication network of a telecommunication service provider). The network 102 may be in communication with one or more access networks 120 and 122, and the Internet (not shown). In one example, network 102 may combine core network components of a cellular network with components of a triple play service network, where triple-play services include telephone services, Internet services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video-on-demand (VoD) server, and so forth. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an Institute of Electrical and Electronics Engineers (IEEE) 802.11/Wi-Fi network and the like), cellular access networks, $3^{rd}$ party networks, and the like. For example, the operator of network 102 may provide a broadband Internet access service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental, or educational institution LANs, and the like.

In one example, the access networks 120 may be in communication with one or more devices, e.g., device 110 and 111. Similarly, access networks 122 may be in communication with one or more devices, e.g., device 112, servers 114, DB(s) 115, servers 116, gateway 192, etc. Access networks 120 and 122 may transmit and receive communications between devices 110-112, server(s) 114, server(s) 116, gateway 192, application server (AS) 104 and/or other components of network 102, devices reachable via the Internet in general, and so forth. In one example, each of the devices 110-112 may comprise any single device or combination of devices that may comprise an endpoint device, e.g., a client device. For example, the devices 110-112 may each comprise a mobile device, a cellular smart phone, a laptop, a tablet computer, a desktop computer, a wearable computing device (e.g., a smart watch, a smart pair of eyeglasses, etc.), an application server, a bank or cluster of such devices, or the like.

In one example, devices 110 and 111 may be associated with users 140 and 141 (e.g., visitors to a premises 190) and device 112 may be associated with another user 142, e.g., an owner or manager of premises 190, or the like. For instance, devices 110 and 111 may have an application (app) installed thereon, which may facilitate making a reservation/rental of premises 190, selecting features/amenities to be used, checking in and checking out at a time of the rental, and so forth. Similarly, device 112 may have an application installed thereon for managing the premises 190, receiving alerts/notifications of request to increase function levels for one or more features/functions and/or reports on the usage of the premises 190. In one example, either or both of devices 110 or 111 may include one or more radio frequency (RF) transceivers (as well as antenna(s), and/or other components) for cellular communications and/or for non-cellular wireless communications, such as for IEEE 802.11 based communications, IEEE 802.15 based communications, and so forth (and similarly for device 112).

Figure 3:
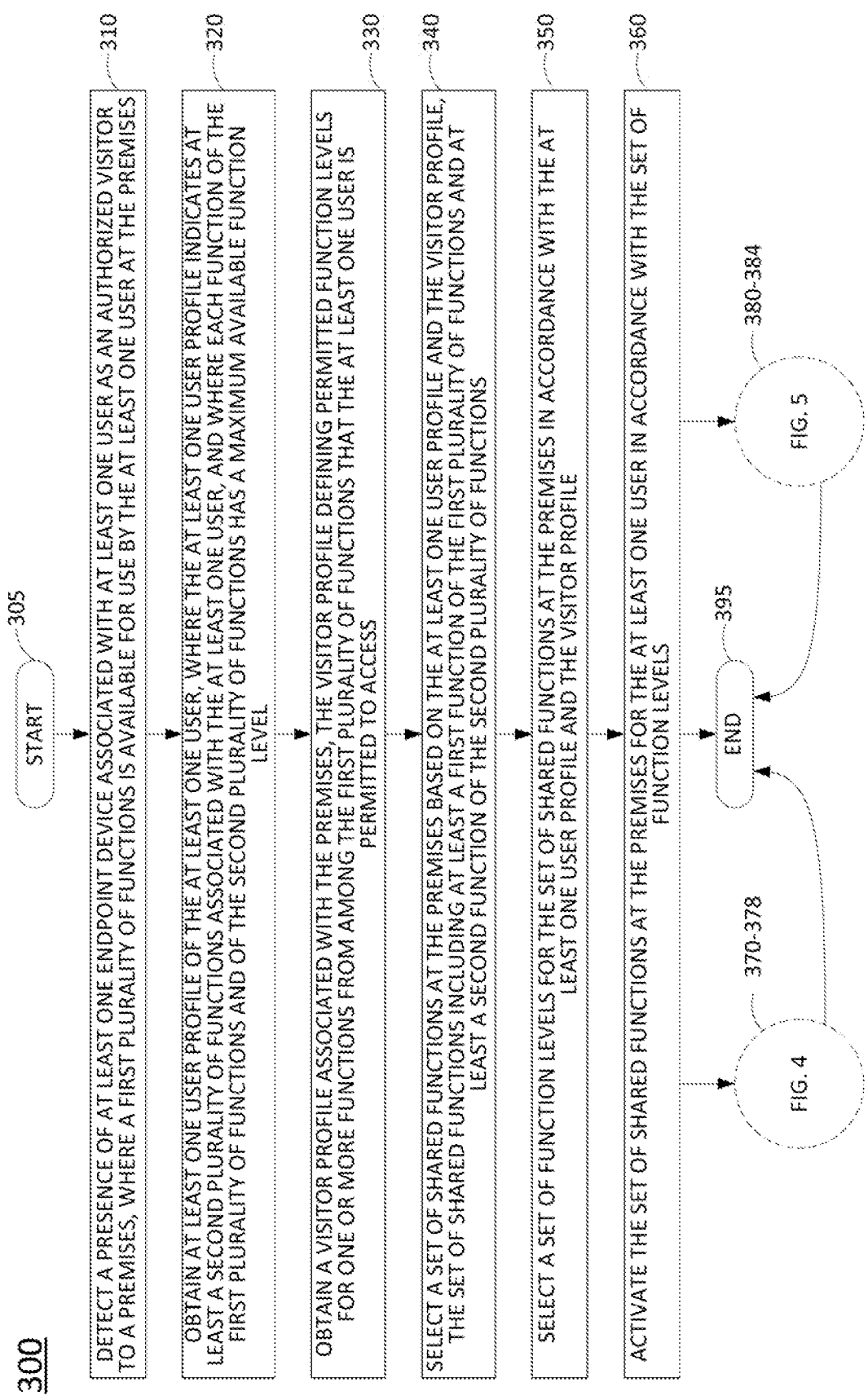
FIG. 3 illustrates a flowchart of an example method for selecting and activating a set of shared functions with a set of function levels at a premises based on at least one user profile and a visitor profile.
Figure 4:
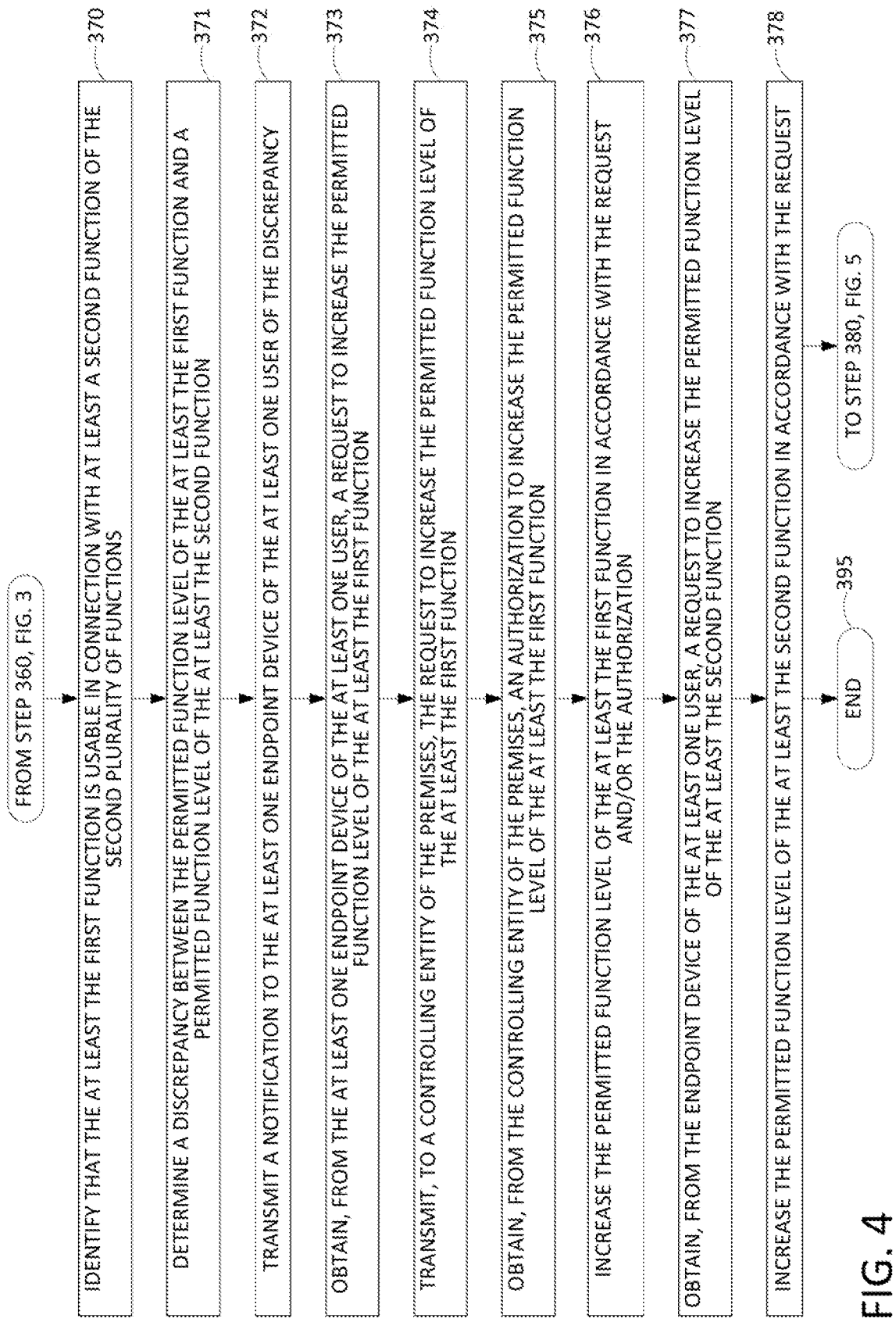
FIG. 4 illustrates a flowchart comprising first additional steps of the example method of FIG. 3, in one example of the present disclosure.
Figure 5:
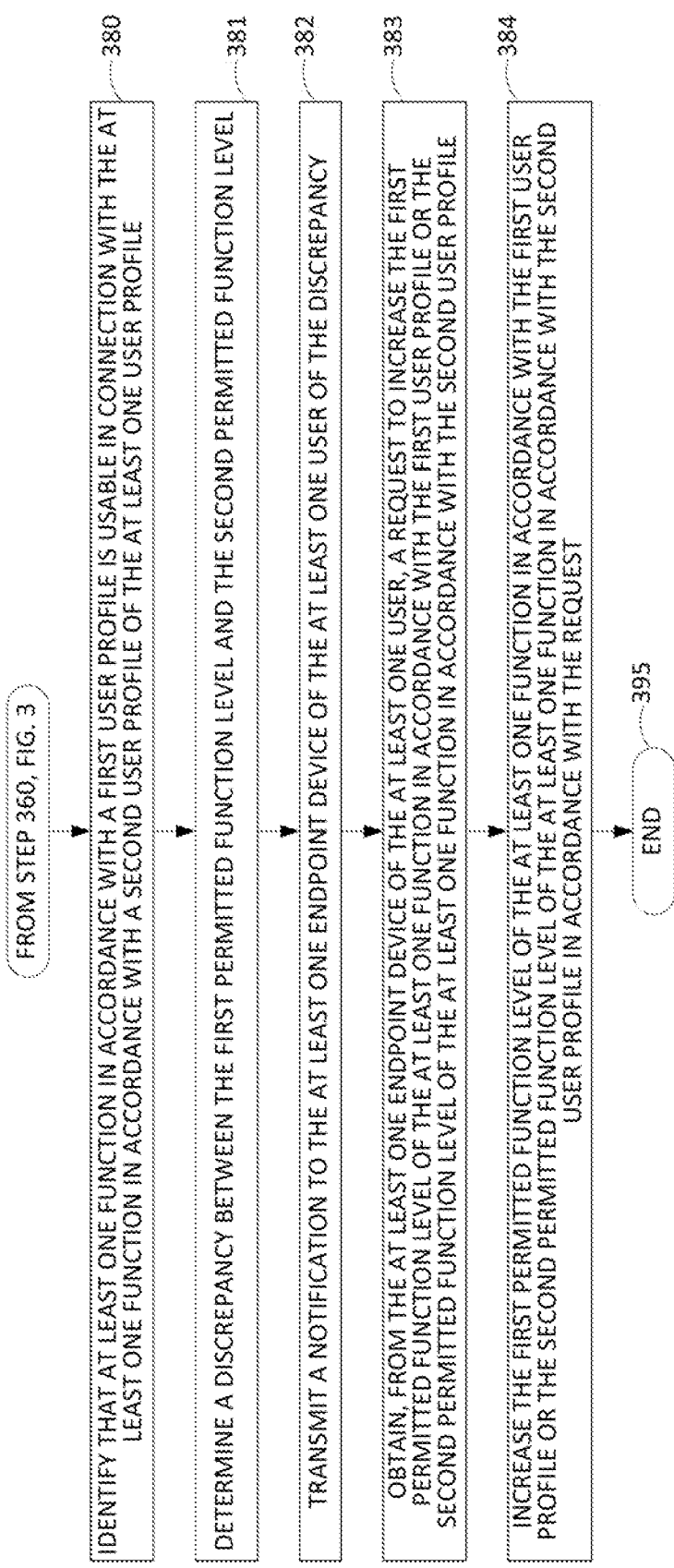
FIG. 5 illustrates a flowchart comprising second additional steps of the example method of FIG. 3, in one example of the present disclosure.
Figure 6:
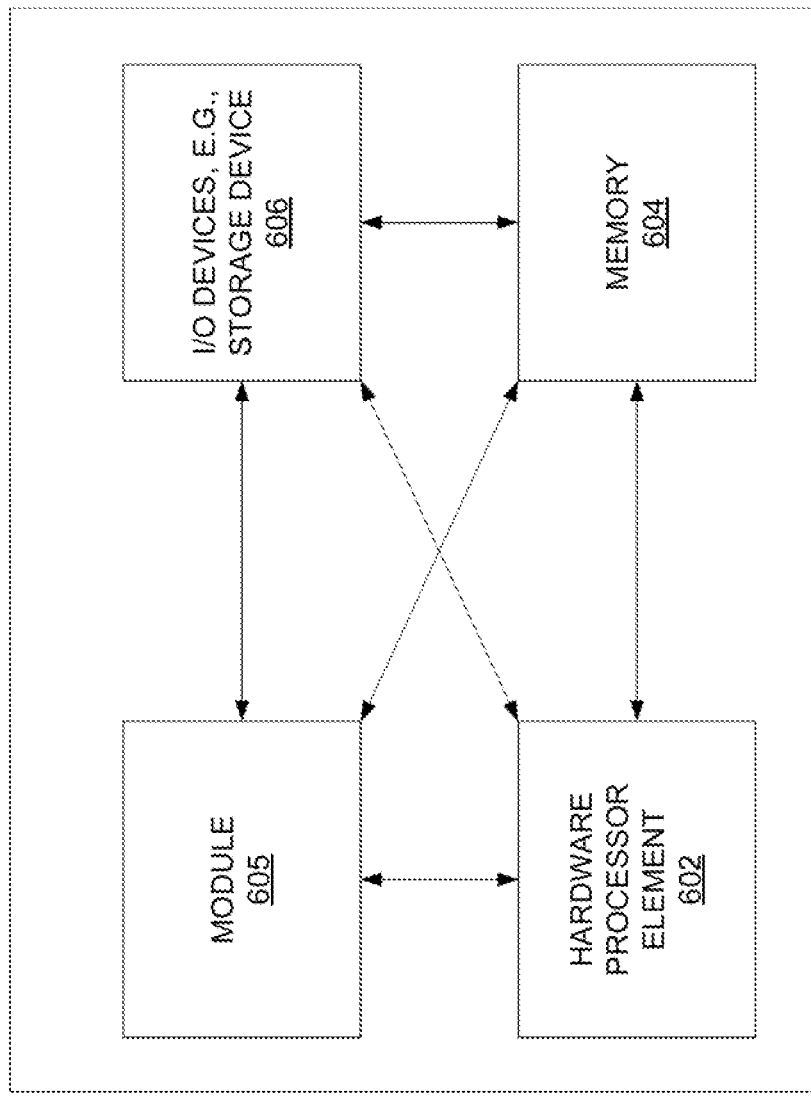
FIG. 6 illustrates a high level block diagram of a computing device specifically programmed to perform the steps, functions, blocks and/or operations described herein.

In one example, devices 110-112 may each comprise a computing device or processing system, such as computing system 600 depicted in FIG. 6, and may be configured to provide one or more operations or functions in connection with examples of the present disclosure for selecting and activating a set of shared functions with a set of function levels at a premises based on at least one user profile and a visitor profile. A flowchart of an example method 300 for selecting and activating a set of shared functions with a set of function levels at a premises based on at least one user profile and a visitor profile is illustrated in FIG. 3 and discussed in greater detail below. In addition, FIGS. 4 and 5 illustrate additional steps that may be included in the example method of FIG. 3, in further embodiments.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 6 and discussed below) or multiple computing devices collectively configured to perform various steps, functions, and/or operations in accordance with the present disclosure.

Similarly, server(s) 114 may each comprise a computing system or server, such as computing system 600 depicted in FIG. 6, and may be configured to perform operations in connection with examples of the present disclosure for selecting and activating a set of shared functions with a set of function levels at a premises based on at least one user profile and a visitor profile, e.g., as described in connection with FIGS. 3-5. For instance, server(s) 114 may provide a network-based system for premises functionality sharing management (e.g., a "premises monitoring and management service") in accordance with the present disclosure. In one example, database(s) 115 may represent one or more centralized or distributed file systems, e.g., a Hadoop® Distributed File System (HDFS™), or the like. Server(s) 114 may receive and store information in database(s) 115 relating to different users, such as users 140 and 141 (e.g., user profiles). In addition, server(s) 114 may receive and store information in database(s) 115 relating to different premises, such as premises 190, the features/amenities of such properties (e.g., "functions" which may comprise physical devices and/or network-based services accessible via such devices), the rentals/reservations of such premises and their features/amenities, the usage of the premises and their features/amenities, during the course of a visit of one or more users, charges and payments for the use of the premises and/or their features/amenities, usage reports, and so forth. For instance, the records pertaining to different premises may include premises records (e.g., storing general information about a premises, the owner and/or responsible entity, the features available therein, the reservations and/or availability thereof, etc.) and visitor profiles (e.g., more specifically storing permissions/availability of features, the function levels of such features that are technically available, the function levels of such features that are permitted for a user or groups of users, etc.). In this regard, an example user profile 210 and an example visitor profile 220 are illustrated in FIG. 2 and discussed in greater detail below. In one example, server(s) 114 may establish communications with gateway 192 and/or devices within premises 190 (e.g., local controller 195) periodically or on another basis to obtain and update all or a subset of the information maintained in database(s) 115 relating to the premises 190.

In one example, AS 104 may comprise a network-based server (or servers) providing a premises monitoring and management service (e.g., a "premises monitoring and management system"). In this regard, AS 104 may comprise the same or similar components as server(s) 114 and may provide the same or similar functions, or at least a portion thereof. For instance, an operator of network 102 may provide a premises monitoring and management service via AS 104 in accordance with the present disclosure (e.g., in addition to telecommunication services such as TV, phone, internet access, etc., as described above). Accordingly, DB(s) 106 may be the same as or similar to DB(s) 115 and may store the same or similar information. Thus, although the following examples are described primarily in connection with server(s) 114, it should be understood that the descriptions may equally apply to AS 104.

As further illustrated in FIG. 1, server(s) 116 may each comprise a computing system or server, such as computing system 600 depicted in FIG. 6, and may be configured to perform operations in connection with examples of the present disclosure for selecting and activating a set of shared functions with a set of function levels at a premises based on at least one user profile and a visitor profile, e.g., as described in connection with FIGS. 3-5. For instance, server(s) 116 may represent one or more network-based services/systems in accordance with the present disclosure. For instance, server(s) 116 may host and may provide a video streaming service, an online gaming service/platform, an audio streaming service, an audio book repository, a translation service, a media storage/backup service (e.g., for user-generated photos, videos, etc.), and so forth.

In one example, premises 190 may include a gateway 192 (e.g., a home gateway), which receives data/communications associated with different types of media, e.g., television, phone, and Internet, and separates these communications for the appropriate devices. Gateway 192 may similarly receive and forward outbound communications from devices at premises 190. In one example, television data is forwarded to set-top boxes (STBs)/digital video recorders (DVRs) 153 and/or 154 to be decoded, recorded, and/or forwarded to television(s) 151 and/or 152 for presentation. In addition, telephone data is sent to and received from one or more telephones (which for ease of illustration are omitted from FIG. 1). Similarly, Internet communications are sent to and received from router 194, which may be capable of both wired and/or wireless communication. In turn, router 194 may receive data from and send data to the appropriate devices, e.g., local controller 195, TVs 151 and 152, STBs/DVRs 153 and 154, sound system 155, refrigerator 156, coffee maker 157, thermostats 158 and 159, camera 161, microphone 162, and so forth. In one example, router 194 may further communicate with user devices such as devices 110-111 of users 140-141 (e.g., renters and/or other authorized visitors of premises 190). In one example, router 194 may comprise a wired Ethernet router and/or an IEEE 802.11 (Wi-Fi) router, and may communicate with respective devices in or at premises 190 via wired and/or wireless connections. In this regard, it should be noted that various features of premises 190 may comprise "smart" appliances (e.g., network-connected devices/Internet of Things (IoT) devices), with wired and/or wireless networking/communication capability. Thus, such appliances may be remotely programmed or configured, and may communicate operational data to remote devices via one or more networks or network links. These appliances may include refrigerator 156, coffee maker 157, a microwave (not shown), thermostats 158 and 159, a grill (not shown), and so forth. For instance, each of these devices may include a transceiver for IEEE 802.11-based communications, for IEEE 802.15-based communications, for wired communications, e.g., for wired Ethernet, and so forth.

In one example, premises 190 may include local controller 195. In one example, the local controller 195 may comprise a computing system, such as computing system 600 depicted in FIG. 6, and may be configured to perform one or more functions for selecting and activating a set of shared functions with a set of function levels at a premises based on at least one user profile and a visitor profile, in accordance with the present disclosure. In accordance with the present disclosure, local controller 195 may be in communication with various network-connected devices/appliances at premises 190. In addition, local controller 195 may be in communication with devices 110 and 111 of visiting users 140 and 141 (e.g., when present at the premises 190 and within communication range of local controller 195 and/or router 194). In this regard, local controller 195 may also include a transceiver for IEEE 802.11-based communications, for IEEE 802.15-based communications, for wired communications, e.g., for wired Ethernet, and so forth. For ease of illustrate, the numerous connections between local controller 195 and various devices at premises 190 are omitted from illustration in FIG. 1. It should be noted that as described herein, one or more functions of local controller 195 may similarly be performed by server(s) 114, and vice versa.

In an illustrative example, users 140 and 141 may have a reservation for the use of premises 190 for a given period of time. The reservation may be made by one or both of the users 140 and 141, e.g., via corresponding applications on the devices 110 and 111 in communication with server(s) 114, e.g., a network-based system for premises functionality sharing management. In one example, digital keys may be provided to devices 110 and 111 in order to physically access the premises 190, to indicate the presence of users 140 and 141, respectively, and to enable local controller 195 to activate/deactivate various functions and to set the function levels thereof. For instance, the keys/codes may be presented to one or more electronic locks to open one or more doors and gain physical access to the premises.

In one example, users 140 and 141 may pre-select features/amenities that may be made available and used at premises 190. In one example, some features may be available by default, while other features may be available for an additional fee and/or upon approval of the user 142 (e.g., a premises owner or the like). In one example, one or more features may have default function levels selected in advance. For instance, the premises 190 may have a subscription for a streaming video service that provides access to video up to 8K resolution. However, this may be reserved for the user 142 only, whereas guests may access the streaming video service, but at a lower function level (e.g., up to 4K resolution, or the like). In one example, such a maximum available function level (e.g., 8K) and maximum permitted function level (e.g., 4K) may be recorded in a visitor profile, which may be stored and maintained by local controller 195 and/or maintained by server(s) 114 (e.g., in DB(s) 115) and retrieved by local controller 195 when devices 110 and 111 of users 140 and 141 are detected to be present at premises 190.

Continuing with the present example, user 140 may arrive at premises 190 and may access the premises 190, e.g., with a passcode provided to user 140 at device 110, a physical key provided to user 140 in some manner, etc. Similarly, user 141 may arrive at premises 190 and may access the premises 190, e.g., with a passcode provided to user 141 at device 111. Local controller 195 may then retrieve the user profiles of users 140 and 141, e.g., from server(s) 114 and/or DB(s) 115. In one example, local controller 195 may further retrieve a visitor profile for users 140 and 141 (and/or a visitor profile that is generally applicable to the premises 190) from server(s) 114 and/or DB(s) 115 (e.g., in an example in which local controller 195 does not store such a visitor profile on a long-term basis (e.g., persistent across a plurality of visitors' usage of the premises 190)).

In one example, local controller 195 may then select a set of shared functions and select a set of function levels for the set of shared functions at the premises 190 based on one or both of the user profiles, and based upon the visitor profile. In addition, the local controller may activate such functions at the premises 190 in accordance with the selections. For instance, local controller 195 may enable (or disable) access to TVs 151 and/or 152, STBs/DVRs 153 and/or 154, camera 161, microphone 162, sound system 155, thermostats 158 and/or 159, etc. For example, such devices may be configured to accept instructions from local controller 195 to enable and disable functionality, including the ability to turn on and off and/or to access certain function levels, etc. In one example, local controller 195 may enable access to a certain network access bandwidth, e.g., via router 194 and/or gateway 192, in accordance with the visitor profile. In one example, local controller 195 may also enable access to one or more network-based services at premises 190 via one or more devices, such as via TVs 151 and 152, devices 110 and 111, etc. For instance, local controller 195 may communicate with one or more network-based services (e.g., represented by server(s) 116) to associate premises 190 with one or more user accounts. For instance, this may include user accounts provided by premises 190 and/or user 142, accounts provided by visiting users 140 and 141 themselves, and so forth. In one example, function levels may be established via communication with the server(s) 116 whereby the local controller 195 may request the highest function level (e.g., the best video quality, the best audio quality, the best access to the most content, etc.) that is available in accordance with the respective accounts of the users 140-142. In one example, the local controller 195 may provide credentials to temporarily associate user accounts of users 140 and 141 with one or more devices of premises 190. For instance, access to a streaming video service may be permitted via TV 151, but not via TV 152. Similarly, camera 161 and microphone 162 may be made available for use in connection with a first type of cloud-based digital assistant service of user 140 but not with a second type of cloud-based digital assistant service of user 141. For instance, these restrictions (e.g., different permitted function levels) may be indicated in the visitor profile.

In one example, user 140 and/or user 141 may have a desire to access an increased function level for one or more functions at some time during the visit to premises 190. For instance, users 140 and 141 may be on vacation together. However, user 140 may have an unscheduled video conference that the user 140 would like to attend and may feel that it is important to have a high quality visual and/audio connection. In one example, user 140 may request and may be granted a higher function level (e.g., increased network access bandwidth). For instance, user 140 may submit the request via an app on device 110 to local controller 195 and/or to server(s) 114. In one example, local controller 195 may forward the request to server(s) 114. Either or both of the local controller 195 and/or server(s) 114 may then notify a network access provider (e.g., an Internet service provider (ISP)) of the request. In one example, the availability of increased bandwidth may be noted in the visitor profile (e.g., 56K permitted, up to 1 Gb available). In one example, the increase may be granted automatically (e.g., assuming there is no network event to prevent the provisioning of bandwidth that is otherwise available), and an additional charge may be recorded to a bill and/or account associated with the users 140 and 141. For instance, an increased charge may be provided to server(s) 114 on behalf of the user 142, where server(s) 114 may attribute the charge(s) to account(s) of the users 140 and/or 141. Alternatively, or in addition, the request may first be transmitted to user 142 (e.g., at device 112) for approval. For instance, the user 142 may be presented with a pop-up notification via an associated app, may be presented with a text message, or the like, where a user input may indicate the permission of user 142 to increase the bandwidth via gateway 192 and/or router 194. After permission is obtained, server(s) 114 may then communicate with the network access provider in the same or similar manner as noted above.

In this regard, it should be noted that a same or similar process may be applied with respect to various other network-based services, which may be associated with the visiting users 140 and 141, or the premises 190. For example, user 140 may have a subscription to an online gaming service that provides access to "standard" games. However, premises 190 may possess a gaming system with a 360 degree headset, gaming station display, or the like. As such, the user 140 may request for the online gaming subscription to be upgraded (e.g., permanently or temporarily for the duration of the visit to premises 190) to enable access to "premium" games that may include 360 degree visual content, for example. For instance, the request may be submitted via device 110 to local controller 195 and/or server(s) 114, whereupon the request may be transmitted to the gaming service (e.g., represented by server(s) 116). In one example, when the request is granted, server(s) 114 may update the user profile of user 140 to indicate the new permitted function level. For instance, the "premium" games may continue to be made available as the user 140 returns home, travels to other visited premises, etc. In another example, the user 140 may already possess access to the "premium" game level, but the premises 190 does not. In a related process to upgrade the premises 190 temporarily, user 140 may upgrade the equipment like the TV 151, 152 via the local controller 195 without having to physically bring the original gaming station display, 360 degree headset, etc.

Additional functions of local controller 195 and/or server(s) 114 for selecting and activating a set of shared functions with a set of function levels at a premises based on at least one user profile and a visitor profile are described in greater detail below in connection with the examples of FIGS. 2 and 3. It should also be noted that the foregoing is just one illustrative example of how examples of the present disclosure for selecting and activating a set of shared functions with a set of function levels at a premises based on at least one user profile and a visitor profile may operate. Thus, it should be noted that in other, further, and different examples, aspects described above with respect to server(s) 114 may alternatively or additionally be provided by AS 104. Similarly, functions or operations described in connection with server(s) 114 may alternatively or additionally be provided by local controller 195. For instance, local controller 195 may store one or more visitor profiles and may enforce limits on the function levels of various services, e.g., without the involvement or with reduced involvement of server(s) 114, and so on. In addition to the foregoing, various other features of the present disclosure may be provided via the system 100, such as enabling users 140 and 141 to check-out at departure via device 110 and/or device 111, to receive any additional charges incurred during the use of premises 190, to approve and/or to pay the additional charges, and so on.

It should also be noted that the system 100 has been simplified. Thus, the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102 and/or access networks 120 and 122 may comprise a content distribution network (CDN) having ingest servers, edge servers, and the like. Similarly, although only two access networks 120 and 122 are shown, in other examples, access networks 120 and/or 122 may each comprise a plurality of different access networks that may interface with network 102 independently or in a chained manner. For example, server(s) 114 and gateway 192 may reach network 102 via different access networks, and so forth. Thus, these and other modifications are all contemplated within the scope of the present disclosure.

To further illustrate aspects of the present disclosure, FIG. 2 depicts an example user profile 210 and an example visitor profile 220. In one example, the user profile 210 may relate to one of the users 140 and 141, and the visitor profile may be associated with the premises 190 of FIG. 1. As illustrated in FIG. 2, user profile 210 includes a number of columns and rows comprising entries for a number of functions/amenities that may be associated with the user. For instance, the user may have subscriptions to two streaming services and a gaming service (e.g., a network-based gaming platform), and may have access to a digital assistant service (e.g., network-based service functions). In addition, the user may have a tablet computer (e.g., a function comprising a physical device). Each entry in user profile 210 may include an identifier of the function/amenity, the available function levels (e.g., the column titled "levels"), a maximum permitted function level when traveling, and a maximum permitted function level when traveling with others. For instance, for the first streaming service (streaming service 1), there may be three available function levels, e.g., video quality of 720p, 1080p, and 4K. In the present example, the maximum permitted function level when the user is traveling is set at 4K. However, the maximum permitted function level when traveling with others may be 720p. For example, both of these maximum permitted function levels may be set according to a subscription level of the user with the first streaming service.

Similarly, for a second streaming service (streaming service 2) there may be the same three available function levels, e.g., video quality of 720p, 1080p, and 4K. However, for the second streaming service, the maximum permitted function level when the user is traveling may be 1080p, while access to the second streaming service is not permitted when traveling with others (e.g., a service level of zero or "not available" (N/A)). For example, the maximum permitted function levels may be set according to a subscription level of the user with the second streaming service. In addition, the tablet computer may have available function levels of 1 Gb/s (e.g., a maximum download bitrate that a radio transceiver of the tablet computer is capable of receiving) and 1080p (e.g., a maximum screen resolution). Notably, since this is a physical device (e.g., an example of a physical "function" as referred to herein) that is owned by the user, the maximum permitted function levels when traveling alone and/or with others are the same as the maximum device capabilities.

Lastly, the example user profile 210 includes an entry for a digital assistant (e.g., a network-based service function) having available function levels of "all commands" and "information only." For instance, "all commands" may include operations to respond to requests for information (e.g., "what is the weather today?," "when is the next inbound train?," "where is the closest fast food restaurant?," etc.) as well as operations that may control IoT or other devices or that may affect additional network-based services (e.g., "change zone 1 temperature to 75 degrees", "turn on porch lights at 7:00 pm", "order pizza for delivery at 7:30 pm", etc.). In the present example, the maximum permitted function levels when traveling alone and/or with others is set to "information only". For instance, the reduced function level of "information only" (e.g., a lesser function level as compared to "all commands") may be set as the maximum permitted function level when travelling (both alone and with others) according to a user agreement with the digital assistant service. For instance, the digital assistant service may determine that a user may be enrolled to access the user's network-based digital assistant via other devices when travelling (such as via a smart speaker at a visited premises), but that commands to control IoT and other devices may be disabled while using such device(s) that are not the user's own.

In a similar manner, visitor profile 220 includes a number of columns and rows comprising entries for a number of functions/amenities that may be associated with the premises, such as premises 190 of FIG. 1. For instance, the premises may have two televisions (TV1 and TV2), an Internet access subscription/service, a cable television programming subscription, and outdoor speakers. Each entry in the visitor profile 220 may include an identifier of the function/amenity, the available function levels (e.g., the column titled "levels"), a maximum permitted function level for visitors, and an indicator of whether a premises owner or other responsible entity has granted approval for automatic increases of the maximum permitted function level upon request of visitor(s) (e.g., when higher function levels are available). For instance, for the TV1, there are three available function levels, e.g., video quality of 720p, 1080p, and 4K. However, insofar as the maximum permitted function level for visitors is already the maximum that the TV1 is capable of providing, the indicator for automatic grant of requests to increase the maximum permitted function level is "not applicable" (i.e., visiting users would not need to request an increase because the visiting users already have access to the maximum). For the Internet/network access service, there are three available function levels (e.g., maximum download bitrates of 1 Gb/s, 500 Mb/s, and 50 Mb/s). In this case, the maximum permitted function level for visitors is set at 50 Mb/s. For instance, the premises owner may have a subscription agreement with the Internet service provider (ISP) that specifies a certain monthly subscription fee that takes into account that the premises is a rental property and that visitors are expected to not exceed 50 Mb/s. However, in accordance with the present disclosure, visitors may be permitted to request increases in this maximum permitted function level (e.g., to request that 500 Mb/s or higher maximum download bitrates be enabled). In addition, these requests may be automatically granted as indicated in the visitor profile 220 (e.g., without requiring approval by the premises owner or another responsible entity on a per-request basis; however, this still may include the ISP passing additional charges to the premises' owner and/or to the visitor for the increased maximum permitted function level).

Likewise, the cable television programming service may have a number of available function levels (e.g., video resolutions of 720p, 1080p, and 4K as well as programming levels of "basic," "deluxe," and "premium"). Notably, there are two dimensions of function levels for this particular function/service. Thus, the maximum permitted function level for the visitor column may include "720p" and "basic" for the cable television programming service. In the example of FIG. 2, the entry for the cable television programming service may also indicate that requests to increase the maximum permitted function level may not automatically be granted. For instance, it may be a significant cost increase to obtain higher function levels that the premises' owner does not want to support. However, in accordance with the present disclosure, visiting users may still make requests, which may be passed to the premises' owner (or another responsible entity), which may be denied or approved. In the case in which a request is approved, a premises monitoring and management service/system of the present disclosure and/or a local controller at the premises may further communicate with the cable television programming service provider to provision/enable the higher function level(s).

In another example, the set of available function levels may be updated by activity triggers. For instance, from the example user profile 220, the internet bandwidth may be typically limited at 50 Mb/s. Although not pictured in 220, a secondary column of maximums may also be provided based on the number of visiting users (or the usage of those visiting users) on the premises 190. In this example, the original owner may set a secondary limit of 1 Gb/s, but allow this service level to be accessible if at least 10 visitor devices are detected or if a 100% utilization of the available bandwidth is sustained for certain streaming applications (like child-oriented programming). In this example, the secondary limit may not be known or conveyed to the visiting user 140, but in order to maintain a satisfactory experience and engagement within the premises for the visitors, the secondary level may be automatically allowed.

The premises may also provide visitors with access to outdoor speakers for the visitors' use. As indicated in the visitor profile 220, the outdoor speakers may be capable of 0 to 100 Watts, and may also have available function levels of "all hours" and "daytime only." In this case, the maximum permitted function level(s) for visitors may be 10 W and "daytime only." In addition, the premises' owner or another responsible entity may configure this function such that requests to increase the maximum permitted function level(s) are not automatically granted. For instance, the premises' owner or another responsible entity may have a strong interest in being a good neighbor and for the premises to remain relatively quiet. However, upon request and specific approval, an increased maximum permitted function level could be provided to visitors, such as if the premises is rented for a wedding or other special events that may be a rare occurrence. A last entry may be for TV2, which is similar to the entry for TV1. However, in this case TV2 may have greater capabilities compared to TV1 and may have a maximum available function level of 8K screen resolution (which is also the maximum permitted function level for visitors).

It should be noted that FIG. 2 illustrates just one example of a user profile 210 and a visitor profile 220, and that user profiles and visitor profiles may have a variety of different forms, may include or more less fields, may include different fields, and so forth. As just one example, the user profile 210 may also include a maximum permitted function level for when the user is at home. For instance, for streaming service 2, there may be three available function levels. However, the user may have subscribed to the middle function level (e.g., 1080p video quality), which may therefore be provided even when the user is at home. In addition, the function levels in various entries in user profile 210 and visitor profile 220 are illustrative in nature. Thus, in other, further, and different examples, various other function levels may be applicable. For instance, for gaming service 1, there may be additional available function levels for "rectangular display" and "360-degree" visual feeds. In addition, the cable television programming service may include available function levels of "sports package" and "no sports package" for example. Likewise, in one example, visitor profile 220 may include a "cost" column which may indicate the cost for increases of function levels for one or more functions. For instance, a premises monitoring and management service/system of the present disclosure and/or a local controller may provide to visiting users the costs (if any) associated with increases in maximum permitted function levels that the user(s) may be considering. It should also be noted that although FIG. 2 illustrates just one example user profile 210, in various examples, the user profiles of two or more users may be accessed and used to provision function access and to set function levels for various functions at a premises. In such case, additional user profiles may be of a same or a similar nature as the example user profile 210, but may include different available functions, different available function levels, different permitted function levels, and so forth. These and other aspects of the present disclosure are further illustrated in connection with FIGS. 3-5, and described in greater detail below.

FIG. 3 illustrates a flowchart of an example method 300 for selecting and activating a set of shared functions with a set of function levels at a premises based on at least one user profile and a visitor profile. In one example, the method 300 is performed by one or more servers of a premises monitoring and management system, or service, such as server(s) 114 or AS 104 of FIG. 1, a local controller, which may be a standalone device/apparatus and/or integrated with a residential gateway or the like (e.g., local controller 195 of FIG. 1 and/or a gateway 192), or any one or more components thereof, or by any one or more of such servers or devices in conjunction with one another and/or in conjunction with other devices and/or components of system 100 of FIG. 1. In one example, the steps, functions, or operations of method 300 may be performed by a computing device or processing system, such as computing system 600 and/or hardware processor element 602 as described in connection with FIG. 6 below. For instance, the computing system 600 may represent any one or more components of the system 100 that is/are configured to perform the steps, functions and/or operations of the method 300. Similarly, in one example, the steps, functions, or operations of the method 300 may be performed by a processing system comprising one or more computing devices collectively configured to perform various steps, functions, and/or operations of the method 300. For instance, multiple instances of the computing system 600 may collectively function as a processing system. For illustrative purposes, the method 300 is described in greater detail below in connection with an example performed by a processing system. The method 300 begins in step 305 and proceeds to step 310.

At step 310, the processing system (e.g., an on-premises network access point, such as a local controller and/or local controller integrated with a gateway, or the like) detects a presence of at least one endpoint device associated with at least one user as an authorized visitor to a premises, where a first plurality of functions is available for use by the at least one user at the premises. In one example, step 310 may include obtaining a digital key/code from the endpoint device(s) that may have been provided to the device(s) in connection with a reservation for use of the premises and its features/amenities.

In accordance with the present disclosure, at least a first function of the plurality of functions may comprise at least one of: a physical device or a network-based service. In addition, in accordance with the present disclosure, at least a first function of the first plurality of functions may have a first plurality of available function levels, and wherein a permitted function level (e.g., a maximum permitted function level) of the at least the first function may be a lesser function level than a maximum available function level of the at least the first function. For instance, in the example of FIG. 2, a premises may have a first television (e.g., TV1) with a maximum available function level of "4K" screen resolution, an Internet/network access service with a maximum available function level of a 1 Gb/s download bitrate, and so forth.

At step 320, the processing system obtains at least one user profile of the at least one user, where the at least one user profile indicates at least a second plurality of functions associated with the at least one user, and where each function of the first plurality of functions and of the second plurality of functions has a maximum available function level. In one example, the at least one user profile comprises at least two user profiles of at least two users. In one example, the at least one user profile may be obtained from a network-based computing system that maintains a plurality of user profiles for a plurality of users, where the at least one user profile is associated with the at least one endpoint device associated with the at least one user.

At step 330, the processing system obtains a visitor profile associated with the premises, the visitor profile defining permitted function levels (e.g., maximum permitted function levels) for one or more functions from among the first plurality of functions that the at least one user is permitted to access. For instance, the visitor profile may be for all visitors in a group and/or may be associated with the premises in general (e.g., applicable for all visitors alone and/or in different groups). In one example, the visitor profile may also be obtained from the network-based computing system, where the network-based computing system maintains a plurality of visitor profiles for a plurality of premises, and where the visitor profile is associated with the premises. For instance, the visitor profile may be defined by a controlling entity of the premises. In one example, at least a portion of the visitor profile may be in accordance with restrictions/limits imposed by one or more providers of network-based services.

At step 340, the processing system selects a set of shared functions at the premises based on the at least one user profile and the visitor profile, the set of shared functions including at least a first function of the first plurality of functions and at least a second function of the second plurality of functions. In one example, this may include features/amenities provided by the premises as well as features/amenities brought along by the at least one user. In an example in which the at least one user comprises two or more users, the set of shared functions may include at least one function in accordance with a first user profile of at least two user profiles and at least one function in accordance with a second user profile of the at least two user profiles. For instance, the at least one function in accordance with the first user profile may comprise at least one of: a mobile computing device or a gaming device, and the at least one function in accordance with the second user profile may comprise at least one of: a network-based streaming service or a network-based gaming service. Notably, examples of the present disclosure may combine functions of the two users who are visitors to the premises. For instance, in one example, the first user may bring an endpoint device and obtain access to the second user's services in a shared space. In one example, this sharing/combining of functions may be a specific type of permission for subscription services. For example, as illustrated in FIG. 2, the example user profile 210 illustrates different permission levels for traveling when alone and when traveling with others.

At step 350, the processing system selects a set of function levels for the set of shared functions at the premises in accordance with the at least one user profile and the visitor profile. For instance, the processing system may select a function level that is the maximum permitted function level for the function according to any subscription (e.g., of one or more visiting users and/or of the premises itself). For example, both a first user and the premises may have subscriptions to a streaming video service. However, the premises may have a subscription with a higher permitted function level. As such, the superior subscription of the premises may be used to obtain access to the streaming video service for the one or more users during the visit.

It should be noted that in some cases, the permitted function level when traveling according to a user's subscription may be less than a permitted function level when the user is at home, and the permitted function level when traveling with others may be an even lesser function level. For instance, in one example, an entire service may be held to a lower permitted function level for a first user, even on the first user's own device(s) when visiting the premises with another user (e.g., for simplicity, or because the service may deem that the video quality should be downgraded when others will be watching the content on the subscribed service, even on the user's own device(s), etc.). In addition, the second user profile of the second user may specify similar restrictions for one or more functions/services of the second user.

At step 360, the processing system activates the set of shared functions at the premises for the at least one user in accordance with the set of function levels. For instance, the activating may include enrollment of network services of the at least one user and/or of the premises via one or more devices at the premises. For example, the processing system may act as a proxy to log into a user account of the streaming video service via a television (e.g., a smart TV) and/or a set-top box at the premises. Similarly, a smart speaker may be associated with a network-based digital assistant of the at least one user, e.g., by acting as a proxy to log into the user's account with a digital assistant service and configure the smart speaker to transmit recorded sounds to the digital assistant service and to receive and present content from the digital assistant service. In one example, devices at the premises may be instructed to set and enforce performance limits, e.g., as directed by the visitor profile. For instance, an outdoor speaker system may be instructed to limit output power to 10 W (e.g., while the system may be capable of significantly more). Similarly, the user(s) may be enabled to control a single climate control zone via a first thermostat, but may not have any access to a second thermostat for a second climate control zone of the premises.

In one example, following step 360, the method 300 may proceed to step 395 where the method 300 may end. However, in other examples the method 300 may proceed to optional step 370 and/or optional step 380. In this regard, reference is made to FIGS. 4 and 5 which illustrates optional steps 370-378 and optional steps 380-384, respectively.

At optional step 370 (see FIG. 4), the processing system may identify that the at least the first function is usable in connection with at least a second function of the second plurality of functions. For instance, the at least the first function may comprise at least one of: a television, a computing device, a gaming device, a sound system, or other physical functions/devices, and the at least the second function may comprise a network-based service, e.g., at least one of: a network-based streaming service, a network-based gaming service, or the like. In another example, the at least the first function may comprise a network-based service, e.g., at least one of: a network-based streaming service or a network-based gaming service, and the at least the second function may comprise a network access service.

At optional step 371, the processing system may determine a discrepancy between the permitted function level of the at least the first function and a permitted function level of the at least the second function. It is again noted that the permitted function level of the at least the first function may be a lesser function level than the maximum available function level of the at least the first function. For instance, this may be indicated in the visitor profile associated with the premises. In addition, the at least one user profile may define the permitted function level of the at least the second function. The discrepancy may be, for example, a difference between a screen resolution that a television is able to support (e.g., an available function level) and the video quality for video to be delivered via video streaming service (e.g., a permitted function level). For instance, the television may be capable of displaying 4K video, but the maximum currently permitted to stream may be 1080p. In various examples, the discrepancy may be a device capability and content service level disconnect. For instance, the device may be a premises-based/premises-supplied device and the content service level may be associated with an account of the user with a streaming video service, a network-based gaming service, etc. In another example, the device may be a device of the at least one user (e.g., a tablet computer brought to the premises, or the like) and the content service level may be for an account associated with the premises. In one example, the discrepancy may be a network bandwidth and content service level disconnect. For instance, the user may have a subscription that permits streaming 8K video, whereas the maximum permitted network bandwidth at the premises according to the visitor profile may be 50 Mb/s which cannot support reliable streaming of videos at such quality.

At optional step 372, the processing system may transmit a notification to the at least one endpoint device of the at least one user of the discrepancy. In one example, the notification may include an invitation to request an increase in the permitted function level of the at least the first function. In one example, the notification may provide fee information, e.g., costs associated with the increase, if requested and obtained. Alternatively, or in addition, such information may be made available to the at least one user via the at least one endpoint device, such as via an app associated with a premises monitoring and management service/system from which the information may be requested and obtained.

At optional step 373, the processing system may obtain, from the at least one endpoint device of the at least one user, a request to increase the permitted function level of the at least the first function.

At optional step 374, the processing system may transmit, to a controlling entity of the premises, the request to increase the permitted function level of the at least the first function. For instance, in the case that the visitor profile does not permit automatic granting of such request (see, e.g., visitor profile 220 of FIG. 2), the request may be passed to the controlling entity (e.g., a premises' owner or another responsible entity).

At optional step 375, the processing system may obtain, from the controlling entity of the premises, an authorization to increase the permitted function level of the at least the first function.

At optional step 376, the processing system may increase the permitted function level of the at least the first function in accordance with the request of optional step 373 and/or the authorization of optional step 375 (e.g., in an example in which such authorization is obtained). In one example, optional step 376 may include transmitting, to a network-based computing system associated with the at least the first function, a request to increase the permitted function level of the at least the first function. For instance, this may include a communication to an ISP/network access provider, a streaming service, an online gaming service/platform, etc. In one example, optional step 376 may include recording the increase in the visitor profile and then setting the function level accordingly. In one example, optional step 376 may include charging and/or obtaining an additional fee from the at least one user.

At optional step 377, the processing system may obtain, from the endpoint device of the at least one user, a request to increase the permitted function level of the at least the second function. For instance, the visited premises may have a television or another device with capabilities beyond the at least one user's home television. In such case, the user may wish to increase a subscribed function level of a streaming video service to match the greater capabilities of the television at the visited premises.

At optional step 378, the processing system may increase the permitted function level of the at least the second function in accordance with the request. For instance, optional step 378 may include transmitting, to a network-based computing system associated with the at least the second function, a request to increase the permitted function level of the at least the second function. For instance, optional step 378 may be the same or similar to optional step 376. In one example, optional step 378 may include updating the user profile, e.g., as stored by the processing system and/or by a separate premises monitoring and management service/system. In various examples, the increase can be temporary or permanent/semi-permanent. In other words, the increase may be persistent (e.g., the new permitted function level will continue for the next travel session and/or when the user returns home unless the user takes a further action to change).

Following optional step 378, the method 300 may proceed to step 395 where the method 300 ends, or may proceed to optional step 380 (e.g., in an example in which the steps of FIGS. 4 and 5 are performed in a serial manner).

At optional step 380 (see FIG. 5), the processing system may identify that at least one function in accordance with a first user profile is usable in connection with the at least one function in accordance with a second user profile of the at least one user profile. For instance, as noted above, in one example, the at least one user profile may comprise at least two user profiles of at least two users. As noted above, in one example, the first user profile may define a first permitted function level of the at least one function in accordance with the first user profile, and the second user profile may define a second permitted function level of the at least one function in accordance with the second user profile. In one example, optional step 380 may comprise operations similar to optional step 370 discussed above. For instance, the at least one function in accordance with the first user profile may comprise a network-based service, e.g., at least one of: a network-based streaming service, a network-based gaming service, or the like and the at least one function in accordance with the second user profile may comprise at least one of: a computing device, a gaming device, a sound system, or other physical devices (e.g., a physical "function" as referred to herein).

At optional step 381, the processing system may determine a discrepancy between the first permitted function level and the second permitted function level. For instance, optional step 381 may comprise similar operations as optional step 371 discussed above.

At optional step 382, the processing system may transmit a notification to the at least one endpoint device of the at least one user of the discrepancy. In one example, the notification may be transmitted to endpoint devices of the at least two users.

At optional step 383, the processing system may obtain, from the at least one endpoint device of the at least one user, a request to increase the first permitted function level of the at least one function in accordance with the first user profile or the second permitted function level of the at least one function in accordance with the second user profile. In one example, the request may be received from an endpoint device of the user associated with the function for which the increase is being request. For instance, if the first user is a subscriber to a streaming video service and it is desired to increase the permitted function level of the streaming video service to match the capabilities of the second user's tablet computer, the request may come from the endpoint device of the first user. However, in another example, the processing system may permit requests to be received from any user in a party/group visiting a premises together.

At optional step 384, the processing system may increase the first permitted function level of the at least one function in accordance with the first user profile or the second permitted function level of the at least one function in accordance with the second user profile in accordance with the request. In one example, optional step 384 may comprise similar operations as optional step 376 or 378 discussed above. For instance, optional step 384 may include transmitting, to a network-based computing system associated with the at least the first function, a request to increase the first permitted function level of the at least one function in accordance with the first user profile or the second permitted function level of the at least one function in accordance with the second user profile. Alternatively, or in addition, optional step 384 may include transmitting instructions to one or more premises-based devices to accommodate any changes, e.g., instructing a Wi-Fi router/manager to enable increased bandwidth for example.

Following step 360 or any of optional steps 370-378 or 380-384, the method 300 may proceed to step 395 where the method 300 ends.

It should be noted that the method 300 may be expanded to include additional steps, or may be modified to replace steps with different steps, to combine steps, to omit steps, to perform steps in a different order, and so forth. For instance, in one example the processing system may repeat one or more steps of the method 300, such as steps 310-360 for additional users and/or groups of users visiting the premises. In one example, the method 300 may include interacting with an entity responsible for the premises to establish and store the visitor profile. In one example, the method 300 may include booking a reservation for the premises for the at least one user, which may include reserving one or more function levels for premises features/amenities in advance. In one example, the selecting of the set of function levels of step 350 may comprise increasing the permitted function level of the at least the first function in accordance with the request of optional step 373 and/or the authorization of optional step 375. In other words, optional steps 370-373 and/or steps 370-375 may be performed prior to step 350. Similarly, optional steps 377-378 may precede step 350. In one example, optional steps 380-384 may be performed prior to optional steps 370-378 (or in parallel). In one example, the method 300 may be expanded or modified to include steps, functions, and/or operations as described in connection with FIGS. 1 and 2 and/or as described elsewhere herein. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the respective methods can be stored, displayed and/or outputted to another device as required for a particular application. Furthermore, operations, steps, or blocks in FIGS. 3-5 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 6 depicts a high-level block diagram of a computing system 600 (e.g., a computing device or processing system) specifically programmed to perform the functions described herein. For example, any one or more components or devices illustrated in FIG. 1, or described in connection with FIGS. 2-5, may be implemented as the computing system 600. As depicted in FIG. 6, the computing system 600 comprises a hardware processor element 602 (e.g., comprising one or more hardware processors, which may include one or more microprocessor(s), one or more central processing units (CPUs), and/or the like, where the hardware processor element 602 may also represent one example of a "processing system" as referred to herein), a memory 604, (e.g., random access memory (RAM), read only memory (ROM), a disk drive, an optical drive, a magnetic drive, and/or a Universal Serial Bus (USB) drive), a module 605 for selecting and activating a set of shared functions with a set of function levels at a premises based on at least one user profile and a visitor profile, and various input/output devices 606, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 602 is shown, the computing system 600 may employ a plurality of hardware processor elements. Furthermore, although only one computing device is shown in FIG. 6, if the method(s) as discussed above is implemented in a distributed or parallel manner for a particular illustrative example, e.g., the steps of the above method(s) or the entire method(s) are implemented across multiple or parallel computing devices, then the computing system 600 of FIG. 6 may represent each of those multiple or parallel computing devices. Furthermore, one or more hardware processor elements (e.g., hardware processor element 602) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 602 can also be configured or programmed to cause other devices to perform one or more operations as discussed above. In other words, the hardware processor element 602 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 605 for selecting and activating a set of shared functions with a set of function levels at a premises based on at least one user profile and a visitor profile (e.g., a software program comprising computer-executable instructions) can be loaded into memory 604 and executed by hardware processor element 602 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 602) executing the computer-readable instructions relating to the above described method(s) can be perceived as a programmed processor or a specialized processor. As such, the present module 605 for selecting and activating a set of shared functions with a set of function levels at a premises based on at least one user profile and a visitor profile (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
   detecting, by a processing system including at least one processor, a presence of at least one endpoint device associated with at least one user as an authorized visitor to a premises, wherein a first plurality of functions is available for use by the at least one user at the premises;
   obtaining, by the processing system, at least one user profile of the at least one user, wherein the at least one user profile indicates at least a second plurality of functions associated with the at least one user, wherein each function of the first plurality of functions and of the second plurality of functions has a maximum available function level;

obtaining, by the processing system, a visitor profile associated with the premises, the visitor profile defining permitted function levels for one or more functions from among the first plurality of functions that the at least one user is permitted to access;

selecting, by the processing system, a set of shared functions at the premises based on the at least one user profile and the visitor profile, the set of shared functions including at least a first function of the first plurality of functions and at least a second function of the second plurality of functions;

selecting, by the processing system, a set of function levels for the set of shared functions at the premises in accordance with the at least one user profile and the visitor profile; and activating, by the processing system, the set of shared functions at the premises for the at least one user in accordance with the set of function levels.

2. The method of claim 1, wherein the at least the first function of the first plurality of functions has a first plurality of available function levels, and wherein a permitted function level of the at least the first function is a lesser function level than the maximum available function level of the at least the first function.

3. The method of claim 2, wherein the at least the first function comprises a physical device or a network-based service.

4. The method of claim 2, further comprising:
identifying that the at least the first function is usable in connection with the at least the second function of the second plurality of functions, wherein the at least one user profile defines a permitted function level of the at least the second function;
determining a discrepancy between the permitted function level of the at least the first function and the permitted function level of the at least the second function; and
transmitting a notification to the at least one endpoint device of the at least one user of the discrepancy.

5. The method of claim 4, wherein the at least the first function comprises at least one of: a television, a computing device, a gaming device, or a sound system, and wherein the at least the second function comprises at least one of: a network-based streaming service or a network-based gaming service.

6. The method of claim 4, wherein the at least the first function comprises at least one of: a network-based streaming service, a network-based gaming service, or an internet access service, and wherein the at least the second function comprises at least one of: a mobile computing device or a gaming device.

7. The method of claim 4, further comprising:
obtaining, from the at least one endpoint device of the at least one user, a request to increase the permitted function level of the at least the first function.

8. The method of claim 7, further comprising:
transmitting, to a controlling entity of the premises, the request to increase the permitted function level of the at least the first function; and
obtaining, from the controlling entity of the premises, an authorization to increase the permitted function level of the at least the first function.

9. The method of claim 7, further comprising:
increasing the permitted function level of the at least the first function in accordance with the request.

10. The method of claim 9, wherein the increasing comprises:

transmitting, to a network-based computing system associated with the at least the first function, a request to increase the permitted function level of the at least the first function.

11. The method of claim 4, further comprising:
obtaining, from the endpoint device of the at least one user, a request to increase the permitted function level of the at least the second function.

12. The method of claim 11, further comprising:
increasing the permitted function level of the at least the second function in accordance with the request.

13. The method of claim 12, wherein the increasing comprises:
transmitting, to a network-based computing system associated with the at least the second function, a request to increase the available function level of the at least the second function.

14. The method of claim 1, wherein the at least one user profile comprises at least two user profiles of at least two users.

15. The method of claim 14, wherein the set of shared functions includes at least one function in accordance with a first user profile of the at least two user profiles and at least one function in accordance with a second user profile of the at least two user profiles.

16. The method of claim 15, wherein the at least one function in accordance with the first user profile comprises at least one of: a mobile computing device or a gaming device, wherein the at least one function in accordance with the second user profile comprises at least one of: a network-based streaming service or a network-based gaming service, and wherein the activating the set of shared functions comprises enabling access to content of the network-based streaming service or the network-based gaming service via at least one of the mobile computing device or the gaming device.

17. The method of claim 14, further comprising:
identifying that the at least one function in accordance with the first user profile is usable in connection with the at least one function in accordance with the second user profile, wherein the first user profile defines a first permitted function level of the at least one function in accordance with the first user profile, wherein the second user profile defines a second permitted function level of the at least one function in accordance with the second user profile;
determining a discrepancy between the first permitted function level and the second permitted function level; and
transmitting a notification to the at least one endpoint device of the at least one user of the discrepancy.

18. The method of claim 1, wherein the at least one user profile is obtained from a network-based computing system that maintains a plurality of user profiles for a plurality of users, wherein the at least one user profile is associated with the at least one endpoint device associated with the at least one user.

19. A non-transitory computer-readable medium storing instructions which, when executed by a processing system including at least one processor when deployed in a communication network, cause the processing system to perform operations, the operations comprising:
detecting a presence of at least one endpoint device associated with at least one user as an authorized visitor to a premises, wherein a first plurality of functions is available for use by the at least one user at the premises;

obtaining at least one user profile of the at least one user, wherein the at least one user profile indicates at least a second plurality of functions associated with the at least one user, wherein each function of the first plurality of functions and of the second plurality of functions has a maximum available function level;

obtaining a visitor profile associated with the premises, the visitor profile defining permitted function levels for one or more functions from among the first plurality of functions that the at least one user is permitted to access;

selecting a set of shared functions at the premises based on the at least one user profile and the visitor profile, the set of shared functions including at least a first function of the first plurality of functions and at least a second function of the second plurality of functions;

selecting a set of function levels for the set of shared functions at the premises in accordance with the at least one user profile and the visitor profile; and activating the set of shared functions at the premises for the at least one user in accordance with the set of function levels.

20. An apparatus comprising:

a processing system including at least one processor; and a computer-readable medium storing instructions which, when executed by the processing system, cause the processing system to perform operations, the operations comprising:

detecting a presence of at least one endpoint device associated with at least one user as an authorized visitor to a premises, wherein a first plurality of functions is available for use by the at least one user at the premises;

obtaining at least one user profile of the at least one user, wherein the at least one user profile indicates at least a second plurality of functions associated with the at least one user, wherein each function of the first plurality of functions and of the second plurality of functions has a maximum available function level;

obtaining a visitor profile associated with the premises, the visitor profile defining permitted function levels for one or more functions from among the first plurality of functions that the at least one user is permitted to access;

selecting a set of shared functions at the premises based on the at least one user profile and the visitor profile, the set of shared functions including at least a first function of the first plurality of functions and at least a second function of the second plurality of functions;

selecting a set of function levels for the set of shared functions at the premises in accordance with the at least one user profile and the visitor profile; and activating the set of shared functions at the premises for the at least one user in accordance with the set of function levels.

* * * * *